United States Patent
Iliffe-Moon

(10) Patent No.: US 12,466,459 B2
(45) Date of Patent: Nov. 11, 2025

(54) USER INTERFACE FOR A VEHICLE, A STEERING WHEEL FOR A VEHICLE AND A VEHICLE

(71) Applicant: Bayerische Motoren Werke Aktiengesellschaft, Munich (DE)

(72) Inventor: Etienne Iliffe-Moon, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/840,853

(22) PCT Filed: Jan. 24, 2023

(86) PCT No.: PCT/EP2023/051718
§ 371 (c)(1),
(2) Date: Aug. 22, 2024

(87) PCT Pub. No.: WO2023/179932
PCT Pub. Date: Sep. 28, 2023

(65) Prior Publication Data
US 2025/0187646 A1 Jun. 12, 2025

(30) Foreign Application Priority Data
Mar. 25, 2022 (DE) ...................... 10 2022 107 166.9

(51) Int. Cl.
*B62D 1/04* (2006.01)
*B60K 35/10* (2024.01)
(Continued)

(52) U.S. Cl.
CPC .............. *B62D 1/046* (2013.01); *B60K 35/10* (2024.01); *B60K 35/22* (2024.01); *B60K 35/60* (2024.01);
(Continued)

(58) Field of Classification Search
CPC .............. B62D 1/046; B60K 2360/782; B60K 2360/1434; B60K 2360/1438;
(Continued)

(56) References Cited

U.S. PATENT DOCUMENTS

2011/0298721 A1* 12/2011 Eldridge ............... G06F 3/0362 345/173
2014/0147087 A1* 5/2014 Lambert ................ G02B 6/08 385/116

(Continued)

FOREIGN PATENT DOCUMENTS

DE 102016220834 A1 4/2018
DE 102017210940 A1 5/2018
(Continued)

OTHER PUBLICATIONS

International Search Report corresponding to International Patent Application No. PCT/EP2023/051718, dated May 8, 2023 (2 pages).

(Continued)

Primary Examiner — Robin J Mishler
(74) Attorney, Agent, or Firm — Maginot, Moore & Beck LLP

(57) ABSTRACT

A user interface for a vehicle presents visible information and acquires user input. The user interface includes a two-dimensional display and an optical faceplate. The two-dimensional display displays information on a display portion. The optical faceplate includes a contact surface, a three-dimensional display surface, and an optic light guide material provided between the contact surface and the three-dimensional display surface. The two-dimensional display includes a pixel arrangement. The contact surface contacts the two-dimensional display to transmit information from the pixel arrangement to the three-dimensional display surface. The three-dimensional display surface is
(Continued)

touch sensitive. The optical faceplate is arrangeable within a cabin of the vehicle.

17 Claims, 3 Drawing Sheets

(51) Int. Cl.
  *B60K 35/22* (2024.01)
  *B60K 35/60* (2024.01)
  *G06F 3/041* (2006.01)
  *G06F 3/0488* (2022.01)

(52) U.S. Cl.
  CPC .......... *G06F 3/0412* (2013.01); *G06F 3/0488* (2013.01)

(58) Field of Classification Search
  CPC ...... B60K 2360/1446; B60K 2360/145; B60K 2360/1523; B60K 2360/199; B60K 2360/336; B60K 2360/344; B60K 35/10; B60K 35/211; B60K 35/22; B60K 35/29; B60K 35/60; G06F 3/0412; G06F 3/0488
  See application file for complete search history.

(56) References Cited

U.S. PATENT DOCUMENTS

| | | | |
|---|---|---|---|
| 2016/0187975 | A1 | 6/2016 | Drescher et al. |
| 2018/0373350 | A1* | 12/2018 | Rao .......................... G06F 3/038 |
| 2020/0039558 | A1 | 2/2020 | Aerts et al. |
| 2020/0079216 | A1 | 3/2020 | Knittl et al. |
| 2021/0394812 | A1 | 12/2021 | Eichhorn et al. |
| 2022/0001912 | A1* | 1/2022 | Mayville ................ B60K 35/00 |

FOREIGN PATENT DOCUMENTS

| | | |
|---|---|---|
| DE | 102020102013 A1 | 7/2021 |
| DE | 102020123873 A1 | 3/2022 |
| EP | 3916442 A1 | 12/2021 |

OTHER PUBLICATIONS

Written Opinion corresponding to International Patent Application No. PCT/EP2023/051718, dated May 8, 2023 (5 pages).
German Search Report corresponding to German Patent Application No. 10 2022 107 166.9, dated Jan. 19, 2023. (5 pages).

* cited by examiner

USER INTERFACE FOR A VEHICLE, A STEERING WHEEL FOR A VEHICLE AND A VEHICLE

The present application is the U.S. national phase of PCT Application PCT/EP2023/051718 filed on Jan. 24, 2023, which claims priority of German patent application No. 10 2022 107 166.9 filed on Mar. 25, 2022, the entire contents of which are incorporated herein by reference.

TECHNICAL FIELD

The present disclosure relates to a user interface for a vehicle, and a steering wheel of a vehicle.

BACKGROUND

A known user interface can comprise a two-dimensional flat display to display information and/or a physical button or knob to capture user input and to provide a physical affordance for the user.

Two-dimensional displays are used to present a variety of information to the driver and/or other passengers of the vehicle. Two-dimensional displays can comprise a touch functionality to capture user input. Thereby, the two-dimensional display with touch functionality, also called touchscreen, can provide a part of the user interface with a large number of functions. During driving it appears to be difficult to make use of the large number of functions, in particular for the driver who needs to pay attention to driving the vehicle. Furthermore, due to a lack of feedback perceivable by a user, e.g., the driver, in case of a touch sensitive display it appears difficult for the user to perform an accurate input, e.g., with a user's finger. For the same reason, the driver is distracted and needs to pay visual and cognitive attention to operate a touch sensitive display. That is, such a two-dimensional display comprises a plurality of aspects that needs to be improved.

Physical buttons provide a physical affordance which provides important benefits, in particular when used in a vehicle. E.g., user-friendliness by providing physical stability to a finger interacting with the button, reduced distraction as opposed to using a touchscreen, and familiarity as the button's physical location and function is substantial and consistent. The physical button allows a blind operation since the user memorizes and/or feels where to find the button, how to operate it and/or which function it has. Thus, compared to a touch sensitive display, a physical button enables a favorable tactile perception. In addition, a physical button may also be an aesthetic feature of the vehicle. However, physical buttons have properties that may be disadvantageous, such as having a dedicated function and a lack of relationship to the digital user interface, e.g., to content that is displayed on a two-dimensional display.

For example, a steering wheel controller, MFL, requires physical affordances to enable familiarity and blind touch that a touchscreen cannot provide. Physical buttons have the benefit of enabling blind touch but have a fixed functionality, so the number of buttons and complexity increases as the functionality of the MFL increases. There are MFLs located on the left and right side of the steering wheel. Currently, the steering wheel controller comprises a button array with, for example, 16 or more buttons in total across both the left and right side MFLs. This number of buttons is perceived as too complex and does not support ease of use to allow a user-friendly input according to the intention of the user. Instead, users cannot memorize the functions of the buttons and might tend to operate the buttons blindly. Furthermore, physical buttons do not appear technically advanced.

As another example, a conventional gear shifter is generally successful as it is fail-safe in that it requires the physical commitment or user intention of the user to physically activate the gear shifter which is the force required to activate and select the gear or drive mode. This safely and reliably prevents inadvertent activation by a driver, a passenger or a child. However, a modern vehicle, in particular an electric vehicle, EV, comprises drive modes, e.g., drive, reverse, park. A digital alternative to a gear shifter may provide benefits, such as reducing costs, creating a more engaging and richer user experience, reducing complexity of the vehicle cockpit and the appearance of the user interface. A digital version of the gear shifter, i.e., a drive mode selector, has the problem of adequately facilitating "user intention" to activate and/or choose a drive mode and/or to activate/deactivate the engine/motor and select the drive modes. A simple flat touchscreen with a graphical user interface does not provide a physical affordance for the user, apart from friction of the finger on the touchscreen and the manipulation of a graphical element of a user interface through a touch gesture. US 2020/0079216 A1 discloses an operating apparatus that comprises a touchscreen and an operating knob in the region of the touchscreen, wherein the knob comprises a sidewall with a plurality of luminous outputs of at least one luminous segment or a pixel matrix. The touchscreen comprises a transparent panel and a pixel matrix.

There is a need, therefore, for an improved or alternative user interface, in particular, to provide a touch-based interaction that requires the correct level of "user intention".

SUMMARY

The above-described need, as well as others, are addressed by the features of at least some embodiments disclosed and claimed herein.

According to an embodiment, a user interface for a vehicle is adapted to present visible information and to acquire user input; the user interface comprises a two-dimensional display for displaying information on a display portion, and an optical faceplate comprising a contact surface, a three-dimensional display surface for displaying information, and an optic light guide material provided between the contact surface and the three-dimensional display surface; wherein the two-dimensional display comprises a pixel arrangement; wherein the contact surface contacts the display to transmit information from the pixel arrangement to the three-dimensional display surface; wherein the three-dimensional display surface is touch sensitive; wherein the faceplate is arrangeable within a cabin of the vehicle. The faceplate being arrangeable within a cabin of the vehicle provides an alternative user interface.

Optionally, the user interface comprises two faceplates, each of the faceplates is arrangeable as steering wheel controllers. The faceplates being arrangeable as steering wheel controllers implies an optionally complementary layout, shape, design and/or construction of each of the faceplates so as to being mountable at a steering wheel and so as to ensure a reliable and user-friendly interaction. The faceplates being arrangeable on a steering wheel enables a reduction of the number of buttons by the using faceplates as a contextual digital user interface.

Optionally, the two faceplates are arrangeable at opposite sides of a steering wheel. The faceplates may be shaped complementary so as to comprise a first faceplate which is adapted to be used by a left hand and a second faceplate which is adapted to be used by a right hand. In particular, the shape of the three-dimensional display surface of each of the two faceplates is shaped complementary to acquire touch input by a user's hand. The steering wheel may be of any size, shape, format and/or type, e.g. circular, yoke or other as disclosed in US 2021/0394812 A1.

Optionally, the user interface is a drive mode selector interface. This allows a reliable activation and/or deactivation of the engine and/or motor and selection of a drive mode according to a user intention. The faceplate comprises a three-dimensional surface form and surface features to provide an affordance to a finger of the user to run over as the user engages the gear shifter user interface on the faceplate.

Optionally, the faceplate is adapted to provide an input interface and an output interface of the drive mode selector. This enables a comprehensive realization of the driver mode selector interface with a faceplate being adapted to display respective information and to acquire user input.

Optionally, the faceplate comprises a plurality of surface portions being separated from each other by an edge, wherein the faceplate comprises, along an elongation axis, an elongated shape. This embodiment provides a tactile or haptic feature that can be sensed by one or more finger of a user and require the "user intention" when engaging with the faceplate to select a drive mode. For the same reason, optionally, the faceplate comprises a plurality of surface portions being separated from each other by an edge, wherein the faceplate comprises a center surface section being parallel to the two-dimensional display and two inclined surface sections, wherein the center surface section is arranged between the inclined surface sections.

According to at least some embodiments, a steering wheel for a vehicle comprises two steering wheel controllers, wherein each of the steering wheel controllers is a faceplate of a user interface as claimed in any one of the preceding claims. The steering wheel is typically at the center of the user experience in the vehicle. Thus, the user interface of the steering wheel is important. These embodiments acknowledge that the steering wheel controllers, MFLs, are an important user interaction device. The MFLs as being a faceplate each provide convenience for simple user input, e.g., functions such as ADAS, music, phone calls, and safety where focus on the road is important. The use of faceplates as the MFLs enables a simplification of complex MFLs without lacking the physical affordance or tactility of physical buttons allowing blind touch.

Optionally, the steering wheel comprises a ring and/or a support member and each of the faceplates is arranged on, inside or outside the ring and/or the support member. Optionally, the ring is open, closed and/or comprises a plurality of ring segments. Two or more faceplates are arranged on the steering wheel in any place, e.g., in the center, on the spokes, interior of the rim, on the exterior Optionally, each of the faceplates is adapted to rotate with a rotation of the steering wheel or each of the faceplates is adapted to remain fixedly arranged irrespective of a rotation of the steering wheel. To allow an improved user experience and/or a cost-effective embodiment.

According to some embodiments, a vehicle comprises the user interface and/or a steering wheel as described above. Optionally, the user interface and/or the steering wheel of the vehicle comprises one or more of the above-described optional features to achieve a technical effect associated therewith.

Features and combinations of features as describes above and features and combinations of features as disclosed in the figures and described with relation to the figures can be used as such or combined without leaving the scope of the invention.

The above-described features and advantages, as well as others, will become more readily apparent to those of ordinary skill in the art by reference to the following detailed description and accompanying drawings.

DETAILED DESCRIPTION

In the figures, the same and functionally similar elements are used with the same reference signs.

Figure 1:
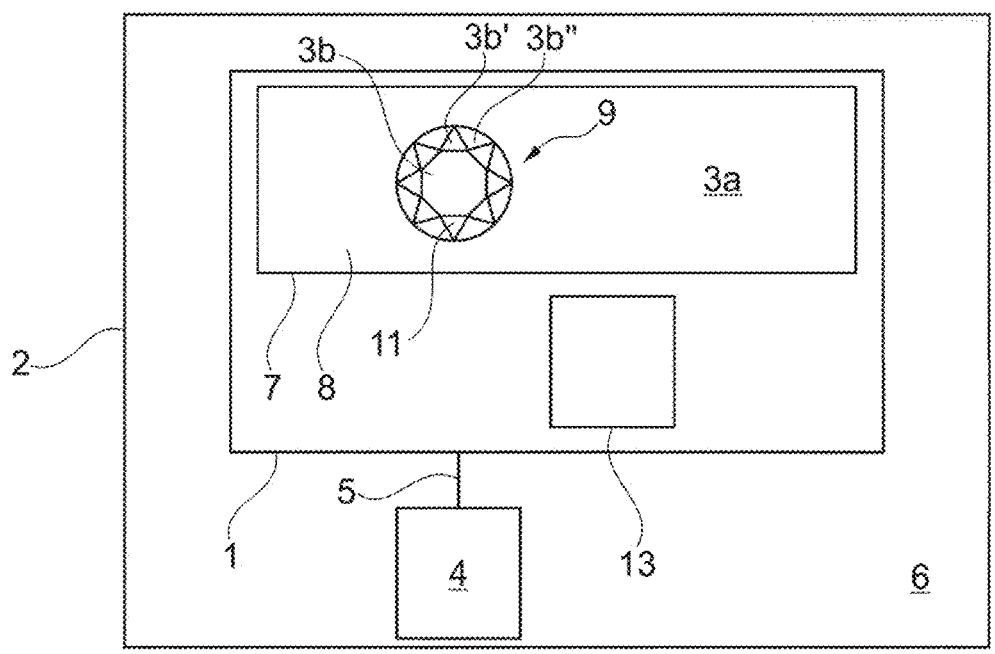
FIG. 1 shows a schematic representation of a user interface comprised by a vehicle according to an embodiment.

FIG. 1 shows a schematic representation of a user interface 1 comprised by a vehicle 2. The user interface 1 is adapted to present visible information 3a, 3b, 3b', 3b'', 3c to a user 4 and adapted to capture user input 5 by a user 4. The user 4 can be a driver of the vehicle 2 and/or a passenger of the vehicle 2. The user 4 can also be a passenger of an autonomously driving vehicle 2. The user interface 1 may be arranged at any surface in the front or rear of the vehicle 1, for any user; e.g., at a steering wheel, dashboard, center console, center armrest, door panel. The user interface 1 is arranged in a cabin 6 of the vehicle 2 so that the user 4 can perceive visible information 3a, 3b, 3b', 3b'', 3c output by the user interface 1.

The user interface 1 comprises a two-dimensional display 7, also called a display panel, for displaying information 3a on a display portion 8. The display portion 8 is a section of the two-dimensional display 7 on which information 3a is displayed in a two-dimensional and visibly perceivable manner. However, information 3a that is displayed can also be rendered to appear three-dimensional, e.g., the display 7 may be a display that simulates 3D, e.g., a stereographic or autostereographic display. The two-dimensional display 7 comprises a pixel arrangement, e.g., a pixel matrix with a two-dimensional array of colored pixels that can be illuminated individually. The two-dimensional display 7 does not necessarily refer to a geometric shape of the display, e.g., the display may be curved and/or bent. The two-dimensional display 7, e.g., CID or panorama display, can be curved or bent about one or more axes, optionally to have a shape that follows a section of the cabin 6 of the vehicle 2. The two-dimensional display 7 is an active matrix, e.g., an MicroLED, OLED, LCD, MicroDisplay, e-paper, rigid or flexible.

Figure 2:
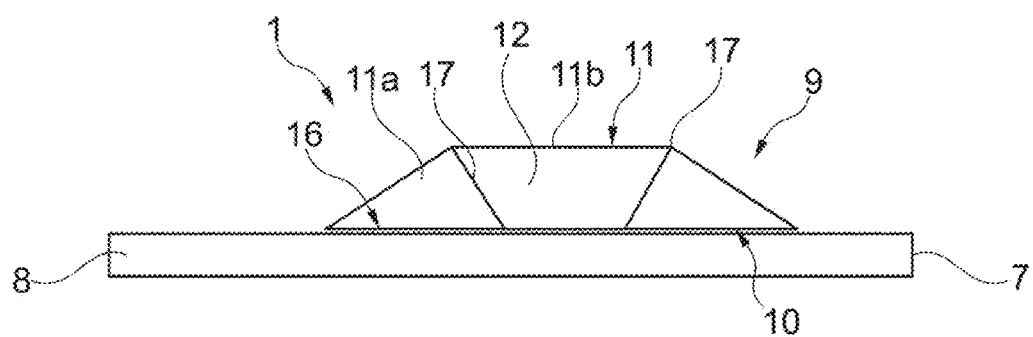
FIG. 2 shows a section of a schematic side view of the user interface shown in FIG. 1.

The user interface 1 comprises an optical faceplate 9 comprising a contact surface 10, a three-dimensional display surface 11 for displaying information 3b, 3b', 3b'', and an optic light guide material 12 provided between the contact surface 10 and the three-dimensional display surface 11 (see also FIG. 2). The faceplate 9 is arranged at a front of the display 7. The faceplate 9 is integrated into the display 7 so that an areal extension of the three-dimensional display surface 11 and/or an areal extension of the contact surface 10 is smaller than an areal extension of the display 7, and so that the contact surface 10 is arranged to receive light emitted from the display 7. The faceplate 9 is mounted to the display 7 so that the faceplate 9 covers a partial area of the display 7. The faceplate 9 and its arrangement are also shown in FIG. 2 and further explained with reference thereto.

In FIG. 1, the user interface 1 comprises the two-dimensional display 7 and the optical faceplate 9 to output the visibly perceivable information 3a, 3b, 3b', 3b''. The faceplate 9 is a localized touchpoint/affordance with specific user interface content and enables user interactions. In one embodiment, in particular if the user interface 1 is a drive mode selector interface 22, the faceplate 9 is substantially smaller than the display 7, e.g., the larger display 7 has a diagonal of 10 inches to 50 inches and the smaller faceplate 9 has a diagonal, diameter and/or characteristic length of 1 inch to 4 inches.

FIG. 2 shows a section of a schematic side view of the user interface 1 shown in FIG. 1. FIG. 2 is described with regard to details of the user interface 1 of FIG. 1.

The two-dimensional display 7 comprises a contact portion 18 that contacts the contact surface 10 of the faceplate 9 to transmit light that is emitted by the two-dimensional display 7 at the contact portion 18 via the contact surface 10 and the light guide material 12 to the three-dimensional display surface 11 where the transmitted light contains the information 3b, 3b', 3b'' that is visible on the three-dimensional display surface 11.

The three-dimensional display surface 11 comprises a plurality of surface portions 11a, 11b that are separated from each other by an edge 17. The faceplate 9 can be shaped to provide a three-dimensional surface that the user may touch. For example, the three-dimensional display surface 11 may be faceted, e.g., like a jewel, as schematically shown in FIGS. 1 and 2 or have segmented or continuous concave, convex, and/or organic surface portions, and/or may have a symmetric or asymmetric, round or rectangular shape (not shown). The surface portions 11a, 11b can also be separated differently than by edges 17, e.g., the surface portions 11a, 11b can appear to flow continuously into each other. Also, a combination thereof and edges 17 is possible. In another non-shown embodiment, an edge or a section of the three-dimensional display surface 11 may be virtually simulated or enhanced by the graphical treatment of the GUI, e.g., digitally change the color/material/finish, material/surface rendering and/or lighting can change the appearance of the faceplate 9.

The display 7 and the faceplate 9 are touch sensitive, e.g., by providing capacitive, resistive, ultra-sonic-based and/or camera-based touch sensitivity, to capture user input 5. The user input 5 can be captured by the touch sensitive display 7 being performed on the two-dimensional display 7 and relative to the faceplate 9 as user interaction. The user input 5 relative to the faceplate 9 can be captured by the three-dimensional display surface 9 which is touch sensitive.

The user input 5, i.e., the touch user input and the user interaction, are transmitted to a data processing device 13 that is comprised by the user interface 1. For receiving the user input 5, the data processing device 13 comprises one or more interfaces to receive, and/or one or more data storages to store, data that represents user input 5 captured by the display 7 and/or relative to the faceplate 9. The data processing device 13 is adapted to derive combined user input 5. Based on the combined user input 5, the user interface 1 is adapted to determine a control signal which contains control data to display information 3a, 3b, 3b', 3b'', 3c on the display portion 8 and/or on the faceplate 9.

The user interface 1 can comprise multisensory feedback such as visual feedback as displayed on the two-dimensional display 7, the faceplate 9, other OLED/LCD displays, ambient lighting or projection, mechanical actuation and/or further tactile feedback, audio feedback such as sound effects or music, and/or olfactory feedback (not shown). The user interface 1 provides multimodal interactions, i.e., haptics and the visually perceivable display of information 3a, 3b, 3b', 3b'', 3c are combined and can further be improved by the application of, e.g., an augmented reality or virtual reality head mounted display.

As shown in FIG. 2, the plurality of edges 17 segments the three-dimensional display surface 11 in a plurality of surface portions 11a, 11b. The user interface 1 is adapted to display information 3b, 3b', 3b'' so that the information 3b', 3b'' that is visible on the plurality of surface portions 11a, 11b can be independent of or dependent on each other, for example, if the content on different facets, i.e., surface portions 11a, 11b, differs from each other or if a content, e.g., button, slide, may bridge across different surface portions 11a, 11b, and be across a larger area, e.g., an interaction may be a swipe across the faceplate 9 and different surface portions 11a, 11b thereof. The user interface 1 is adapted to separately determine the information 3b', 3b'' that is visible on the plurality of surface portions 11a, 11b. I.e., each segment of the three-dimensional display surface 11 of faceplate 9 can display different information 3b, 3b', 3b''.

The user interface 1 is adapted to separately capture user input 5 relative to surface portions 11a, 11b of the faceplate 9. User input 5 separately captured for different surface portions 11a, 11b can be used to derive different combined user input 5. For example, if the user 4 touches a first surface portion and performs a specific touch user input 5 the combined user input 5 can be different than if the user 4 would touch a second surface portion and performs a specific touch user input 5. Touch user input 5 and/or gestures on or across the faceplate 9 may function independently or in combination. The touch sensitivity of the faceplate 9 can be combined with multimodal sensors, e.g., head and/or eye tracking which can be camera based, finger and/or hand proximity and gesture sending for example by a camera such as based on RGB, IR, TOF imaging or LIDAR. Such interactions may include gestures based on touch, mid-air actions and/or mid-air gestures (i.e., gestures that are performed in a distance of 6 to 12 inches from the faceplate 9) and/or a proximity of the hand or finger to the faceplate 9. This can include a tab, slide, drag, long-press, force-touch, multi-touch etc.

The faceplate 9 can be made of glass or a polymer. As indicated schematically in particular in FIG. 2, the faceplate 9 is a solid body without any cavity to ensure an efficient transmission of light. The light that is transmitted from the contact portion 16 of the two-dimensional display 7 to the three-dimensional display surface 11 leaves the faceplate 9 directly at the boundary between the three-dimensional display surface 11 and a surrounding of the faceplate 9, e.g., air, typically the in the cabin 6 of the vehicle 2. I.e., the light that is transmitted from the contact portion 16 is transmitted through only the solid body of the faceplate 9 and has to pass two boundaries only, namely from the contact portion 16 to the contact surface 10 of the faceplate 9 and from the three-dimensional display surface 11 of the faceplate 9 to the surrounding. This reduces the number of boundaries that the light has to pass when travelling from the contact portion 16 to the user. Thereby, optical losses can be held at a low level and high-quality light-transmission is achieved.

Optionally, the light guide material 12 is a composition of many optical fibers (fiber optics elements or similar light guiding material). The light guide material 12 is processed by being drawn and compressed (under heat and pressure) such that the resulting fiber optics elements are on pitch spacing of between 5 and 50 microns or less. Thereby, the faceplate 9 becomes a solid body. The fiber optics elements can be oriented (e.g., as a result of the material processing/formation or the fabrication of the final 3D Faceplate part) to control the viewing angle (i.e., a viewing cone with a central axis longitudinal to an axis of the fiber optics element). The viewing angle of a 3D faceplate 9 is determined in whole by the viewing angle of the fiber optics elements that make up the faceplate 9. The faceplate 9 can provide a high-quality transmission of light and a viewing cone suited to the view angle of the user 4 to be used with a high-resolution two-dimensional display 7, e.g., a two-dimensional display 7 with 4$k$ to 8$k$ resolution and/or a pixel density of 600 pixels per inch or more. However, a pixel density of 150 pixels per inch or 200 pixels per inch is also possible and provides an adequate resolution.

Figure 3:
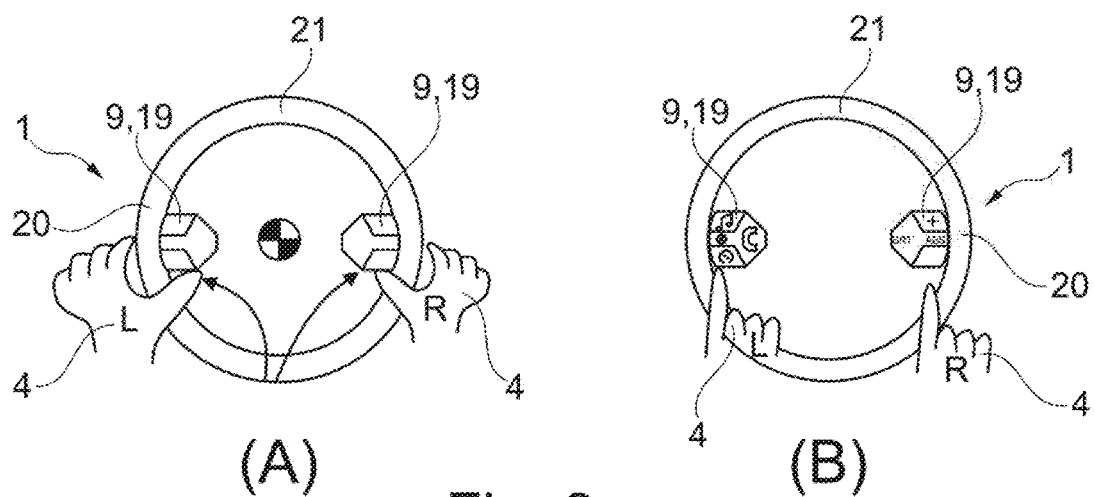
FIG. 3 shows two schematic representations of a user interface according to an embodiment.

FIG. 3 shows two schematics of a user interface 1 according to an embodiment. FIG. 3 is described with reference to FIGS. 1 and 2.

The user interface 1 is the user interface of a steering wheel 20 for a vehicle 1. The user interface comprises two steering wheel controllers 19, wherein each of the steering wheel controllers 19 is a faceplate 9 of the user interface 1 as described with reference to FIGS. 1 and 2.

The steering wheel 20 comprises a ring 21 and the faceplate 9 is arranged inside. The faceplates 9 are adapted to rotate with a rotation of the steering wheel 20. The faceplates 9 are fixedly mounted to the steering wheel 20. The user interface 1 comprises two MFL controllers mounted to the steering wheel 20 incorporating faceplates 9. I.e., each of the faceplates 9 is a steering wheel controller 19. The steering wheel 20 may be of any shape or configuration, e.g., round, rectangular, yoke-shaped. In another embodiment, the steering wheel 20 is not a ring 21, e.g., the steering wheel 20 may be a structure with grips or a structure comprising continuous grip, many grips or multiple grips. The two steering wheel controllers 19 being arranged on the left side and right side on the steering wheel 20 with faceplates 9 can function independently or work in in unison or in conjunction together. Such that an input on one faceplate 9 has a combined effect with an input with the other faceplate 9. This applies to simple touch, tap, press and gesture inputs, such that inputs/gestures bridge both faceplates 9. For example, by finger/thumb gesture of each hand simultaneously across both faceplates 9 may lead to zooming in/out of a map similar to pinch gesture on a smartphone, see FIG. 3(A). Optionally, simultaneous interactions with the faceplates 9 may be required for safety or to unlock a feature, e.g., start engine, autonomous driving.

The contextual digital user interface 1 enables the GUI button functionality of the faceplates 9 to change according to the context of the vehicle, mode, features or functions. For example, a finger press on one steering wheel controller 19 may change the function of the other steering wheel controller 19. This allows for a visually simpler user interface 1 and improve usability. E.g. pressing a Cruise Control button on the left side faceplate 9 may reveal Cruise Control function buttons on the right side faceplate 9, see FIG. 3(B).

Optionally, interactions, either with one of the faceplates 9 and/or the two-dimensional display 7, may trigger functionality on one or more faceplates 9. E.g., an interaction on the steering wheel controllers 19 may have an effect on the drive mode selector interface 22 and/or the two-dimensional display 7. Additionally it is conceivable that an interaction with the steering wheel controllers 19 may be used in conjunction with a simultaneous or sequential interaction with the drive mode selector interface 22, the two-dimensional display 7 and/or a faceplate 9 being arranged elsewhere. E.g., selecting the wing mirror adjustment feature on the two-dimensional display 7 reveals wing mirror adjustment functions on one or more faceplates 9, or vice versa so that an input 5 on one or more faceplates 9 reveals a prompting on the two-dimensional display 7. Optionally, one or more of the faceplates 9 may include an authentication feature, e.g., fingerprint reader, face ID.

Figure 4:
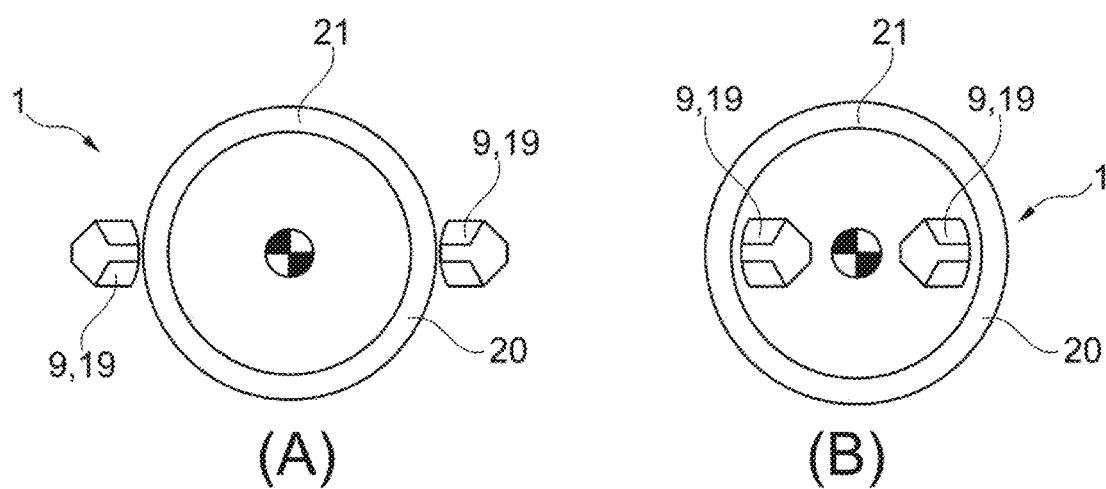
FIG. 4 shows two schematic representations of a user interface according to an embodiment.

FIG. 4 shows two schematics of a user interface 1 according to an embodiment. FIG. 4 is described with reference to FIGS. 1 to 3. The steering wheel 20 comprises a ring 21 and the faceplate 9 is arranged inside (FIG. 4(A)) or outside (FIG. 4(B)) the ring 21.

Figure 5:
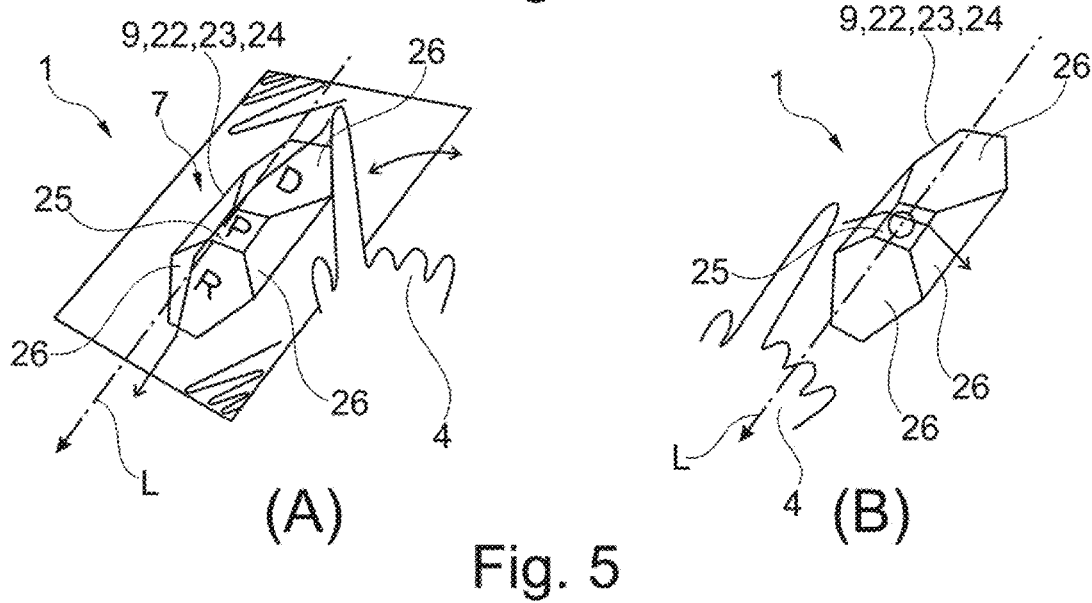
FIG. 5 shows a schematic representation of a user interface according to an embodiment in two different modes.

FIG. 5 shows a schematic of a user interface 1 according to an embodiment in two different modes. FIG. 5 is described with reference to FIGS. 1 and 2.

The faceplate 9 is applied to the two-dimensional display 7 with touch sensing and optionally force sensing. The two-dimensional display 7 may be a dedicated interface for the drive mode selector or combined with an existing display. The faceplate 9 is a drive mode selector interface 22, i.e., a gear shifter, for selecting a driving mode, e.g., Drive, Neutral, Reverse, and/or for active transitioning from one mode to another as the user 4 interacts with the user interface 1, e.g., in real-time. The faceplate 9 may comprise other function than that of the drive mode selector interface 22, e.g., include drive experience mode, e.g., sport, comfort, eco pro, or other drive related settings, e.g., handbrake, traction control.

The faceplate 9 is adapted to provide an input interface 23 and an output interface 24 of the drive mode selector interface 22. To engage or provide user feedback on the user's "user intention", the surface form of the faceplate 9 provides a tactile surface, i.e., passive haptics, for the user's finger(s). Additionally, active haptics, e.g., provided by a Linear resonance actuator, piezoelectric haptic actuator, may provide dynamic haptic feedback, e.g., a singular or continuous "textural" haptic, in real-time during the user's interaction with the user interface 1. The user interface 1 is adapted to output visual and audio output, wherein visual output is displayed on the faceplate 9 and/or the surrounding two-dimensional display 7, e.g., to celebrate the start of motor, beginning of the drive, activation of the drive mode. Additionally, haptics may be communicated to the user 4 via other touchpoints, e.g., the steering wheel haptics, seat haptics, to increase the user feedback associated with "user intention". Optionally, a required "user intention" acts as a "safety catch". Therein, different forms of user input 5 could be required to release the safety catch; examples may include a single finger or multiple finger gestures, e.g., a 2 or 3 finger swipe, a circular gesture, that may require learning by the user 4 applied to the faceplate 9 or applied to both the faceplate 9 and surrounding two-dimensional display 7. The safety catch may be released with or without a learned gesture, wherein the GUI provides target GUI elements that the user 4 is required to negotiate or activate in order to activate the engine/motor and change drive mode or gear; e.g. a single or multiple finger action from one position to another on the 3D Faceplate, or between multiple target positions (e.g. the user needs to drag a GUI element or visually/graphically connect (e.g. draw/sketch such as the user 4 Joins the dots" with their finger similar to a dot-to-dot or connect-the-dots kids drawing exercise) 3 points or 3 surface facets on the faceplate 9.

The faceplate 9 comprises a plurality of surface portions 11a, 11b being separated from each other by an edge 17, wherein the faceplate 9 comprises, along an elongation axis L, an elongated shape. The elongation axis L is parallel to the two-dimensional display surface 7. The faceplate 9 comprises a center surface section 25 being parallel to the two-dimensional display 7 and two inclined surface sections 26, wherein the center surface section 25 is arranged between the inclined surface sections 26.

A user 4 may input a drive mode selection command via the drive mode selector interface 22 by sliding a finder from the two-dimensional display 7, via, along the elongation axis L, the faceplate 9, to the two-dimensional display 7 (FIG. 5(A)). A user 4 may input a user interface activation command via the drive mode selector interface 22 by sliding a finder from the two-dimensional display 7, via, perpendicular to the elongation axis L, the faceplate 9, to the two-dimensional display 7 (FIG. 5(B)).

Figure 6:
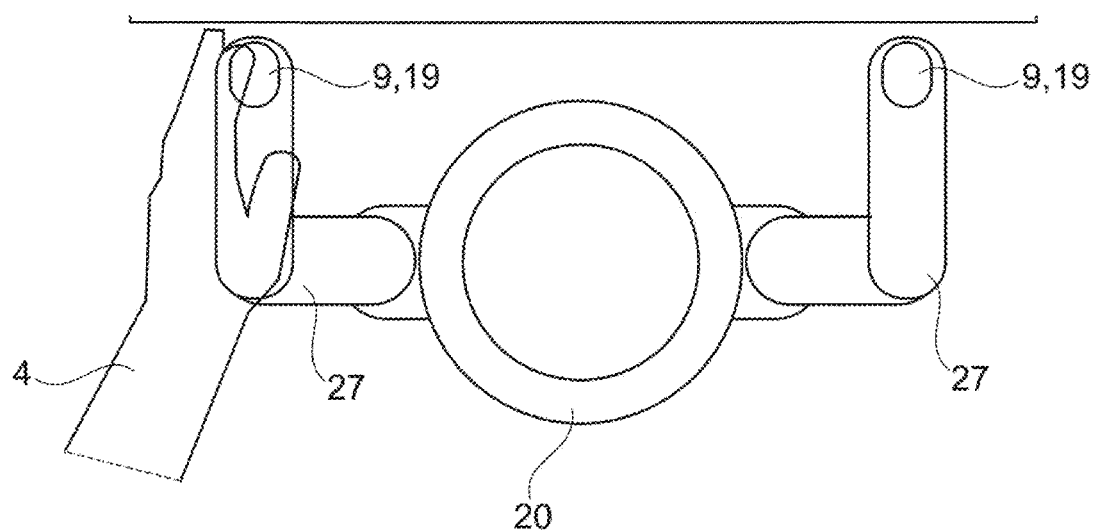
FIG. 6 shows a schematic representation of a user interface according to an embodiment.

FIG. 6 shows a schematic of a user interface 1 according to an embodiment. FIG. 6 is described with reference to FIGS. 1 to 5.

The steering wheel 20 comprises two gripping members 27. On faceplate 9 is arranged as a steering wheel controller 19 at each of the two gripping members 27.

LIST OF REFERENCE SIGNS

1 user interface
2 vehicle
3a, 3b, 3b', 3b" information
4 user
5 user input
6 cabin
7 two-dimension display
8 display portion
9 faceplate
10 contact surface
11 three-dimensional display surface
11a, 11b surface portion
12 light guide material
13 data processing device
16 contact portion
17 edge
18 touch sensitive device
19 steering wheel controllers
20 steering wheel
21 ring
22 drive mode selector interface
23 input interface
24 output interface
25 center surface section
26 inclined surface section
27 gripping member
L elongation axis

The invention claimed is:

1. A user interface for a vehicle configured to present visible information and to acquire user input, the user interface comprising:
a two-dimensional display configured to display information on a display portion;
an optical faceplate comprising a contact surface, a three-dimensional display surface, and an optic light guide material provided between the contact surface and the three-dimensional display surface; wherein
the two-dimensional display comprises a pixel arrangement;
the contact surface contacts the two-dimensional display to transmit information from the pixel arrangement to the three-dimensional display surface;
the three-dimensional display surface is touch sensitive; and
the optical faceplate is arrangeable within a cabin of the vehicle.

2. The user interface as claimed in claim 1, wherein:
the optical faceplate comprises a plurality of surface portions separated by an edge; and the optical faceplate comprises a center surface section, and two inclined surface sections, wherein the center surface section is arranged between the inclined surface sections, and wherein each of the plurality of surface portions displays a different option selectable by the user by user contact with the corresponding surface portion displaying the option.

3. The user interface as claimed in claim 1, wherein:
the user interface is a drive mode selector interface.

4. The user interface as claimed in claim 3, wherein:
the optical faceplate is configured to provide an input interface and an output interface of the drive mode selector interface.

5. The user interface as claimed in claim 4, wherein:
the optical faceplate comprises a plurality of surface portions separated by an edge; and
the optical faceplate comprises an elongated shape along an elongation axis.

6. The user interface as claimed in claim 4, wherein:
the optical faceplate comprises a plurality of surface portions separated by an edge; and
the optical faceplate comprises a center surface section parallel to the two-dimensional display, and two inclined surface sections, wherein the center surface section is arranged between the inclined surface sections.

7. The user interface as claimed in claim 1, wherein:
the optical faceplate comprises a plurality of surface portions separated by an edge; and
the optical faceplate comprises an elongated shape along an elongation axis.

8. The user interface as claimed in claim 1, wherein:
the optical faceplate comprises a plurality of surface portions separated by an edge; and
the optical faceplate comprises a center surface section parallel to the two-dimensional display, and two inclined surface sections, wherein the center surface section is arranged between the inclined surface sections.

9. A steering wheel for a vehicle, comprising two steering wheel controllers, wherein each of the steering wheel controllers comprises:
an optical faceplate comprising a contact surface, a three-dimensional display surface, and an optic light guide material provided between the contact surface and the three-dimensional display surface; wherein
the contact surface contacts a surface to transmit information from a pixel arrangement on a display surface to the three-dimensional display surface, and
the three-dimensional display surface is touch sensitive.

10. The steering wheel as claimed in claim 9, wherein:
the steering wheel comprises a ring and each of the faceplates is arranged on, inside or outside the ring.

11. The steering wheel as claimed in claim 9, wherein:
the steering wheel comprises a support member and each of the faceplates is arranged on, inside or outside the support member.

12. The steering wheel as claimed in claim 9, wherein:
each of the faceplates is adapted to rotate with a rotation of the steering wheel.

13. The steering wheel as claimed in claim 9, wherein:
each of the faceplates is adapted to remain fixedly arranged irrespective of a rotation of the steering wheel.

14. A vehicle comprising the steering wheel as claimed in claim 9.

15. A vehicle comprising the user interface as claimed in claim 1.

16. The steering wheel as claimed in claim 9 wherein:
an optical faceplate of a first of the two steering wheel controllers comprises a plurality of surface portions separated by an edge; and
the optical faceplate of the first of the two steering wheel controllers comprises a center surface section, and two inclined surface sections, wherein the center surface section is arranged between the inclined surface sections, and wherein each of the plurality of surface portions displays a different option selectable by the user by user contact with the corresponding surface portion displaying the option.

17. The user interface as claimed in claim 1, wherein the pixel arrangement comprises a pixel matrix with an array of colored pixels that can be illuminated individually.

\* \* \* \* \*